US012722961B2

(12) United States Patent
Dawson et al.

(10) Patent No.: US 12,722,961 B2
(45) Date of Patent: Sep. 1, 2026

(54) CAP ATTACHMENT SYSTEM

(71) Applicant: Opio Connect, Inc., Whitefish, MT (US)

(72) Inventors: Michael Dawson, Kalispell, MT (US); Thomas Hoffmann, Mooresville, NC (US); Steve Schick, South Range, WI (US)

(73) Assignee: OPIO CONNECT, INC., Whitefish, MT (US)

( * ) Notice: Subject to any disclaimer, the term of this patent is extended or adjusted under 35 U.S.C. 154(b) by 96 days.

(21) Appl. No.: 18/599,010

(22) Filed: Mar. 7, 2024

(65) Prior Publication Data

US 2024/0300795 A1 Sep. 12, 2024

Related U.S. Application Data

(60) Provisional application No. 63/450,574, filed on Mar. 7, 2023.

(51) Int. Cl.
*B67B 3/20* (2006.01)
*B67B 3/26* (2006.01)

(52) U.S. Cl.
CPC ............ *B67B 3/2073* (2013.01); *B67B 3/264* (2013.01); *B67B 3/265* (2013.01); *B67B 2201/017* (2013.01)

(58) Field of Classification Search
CPC ....... B67B 3/2073; B67B 3/264; B67B 3/265; B67B 2201/017
See application file for complete search history.

(56) References Cited

U.S. PATENT DOCUMENTS

| | | | | |
|---|---|---|---|---|
| 1,571,065 A * | 1/1926 | Risser | B67B 3/2073 | 279/66 |
| 1,598,392 A * | 8/1926 | Risser | B67B 3/28 | 53/352 |
| 3,805,488 A * | 4/1974 | Holstein | B67B 3/2073 | 53/367 |
| 4,696,144 A * | 9/1987 | Bankuty | B67B 3/206 | 53/317 |
| 5,400,564 A * | 3/1995 | Humphries | B67B 3/26 | 53/308 |
| 5,419,094 A * | 5/1995 | Vander Bush, Jr. | B67B 3/2073 | 53/317 |
| 5,473,855 A * | 12/1995 | Hidding | B65D 41/04 | 53/317 |
| 9,199,755 B1 * | 12/2015 | Cohen | B67B 7/02 | |

(Continued)

*Primary Examiner* — Anna K Kinsaul
(74) *Attorney, Agent, or Firm* — NGUYEN TARBET IP LAW

(57) ABSTRACT

A device configured to autonomously attach a cap to a bottle in a childproof manner. The device may comprise a cap feed line and a bottle feed line. The device may further comprise a moving arm assembly comprising a cam-chuck component having a plurality of jaws configured to grip, lift, and lower a cap onto the bottle. The device may further comprise a slide compensation assembly configured to prevent over-application of force of the cap to the bottle. The device may further comprise a screw drive assembly configured to screw the cap onto the bottle as downward force is applied. The device may further comprise an optical assembly for detecting errors in picking up the cap.

19 Claims, 15 Drawing Sheets

(56) References Cited

U.S. PATENT DOCUMENTS

| | | | | |
|---|---|---|---|---|
| 2012/0311963 | A1* | 12/2012 | Fukuda | B67B 3/2073 53/317 |
| 2018/0002074 | A1* | 1/2018 | Berg | B65D 41/0471 |
| 2018/0105294 | A1* | 4/2018 | Abboud | B65B 3/003 |
| 2018/0172603 | A1* | 6/2018 | Piana | B67B 3/261 |
| 2020/0377294 | A1* | 12/2020 | Chen | B65B 7/2828 |
| 2024/0208786 | A1* | 6/2024 | Forni | B65B 7/2807 |

* cited by examiner

CAP ATTACHMENT SYSTEM

CROSS-REFERENCES TO RELATED APPLICATIONS

This application is a non-provisional and claims benefit of U.S. Provisional Application No. 63/450,574 filed Mar. 7, 2023, the specification of which is incorporated herein in its entirety by reference.

FIELD OF THE INVENTION

The present invention is directed to a fully automated cap application device for applying childproof caps onto bottles.

BACKGROUND OF THE INVENTION

In pharmaceutical environments, there is a growing need for automated dosage preparation for various drugs to efficiently handle a heavy throughput of patients requiring treatment. An important component of preparing these drugs is properly applying a childproof cap on the bottle after filling said bottle with medicine. In all prior cases, this is done manually.

Automated capping devices exist in drink manufacturing systems, namely plastic bottles having threaded caps. However, these devices are unable to account for the childproof application of caps onto bottles. Additionally, these devices are only able to screw on a cap that is already placed on top of the bottle, and there is no mechanism for picking up the cap, moving it to line up with the bottle, and screwing it on. Furthermore, the caps and bottles used in these devices are specialized for automating the cap application process, and non-specialized caps and bottles are incompatible.

Additional concerns in fully automating the cap application process are detecting whether or not the cap is correctly oriented for application onto the bottle, sensors for checking whether the cap was correctly applied to the bottle, and compliance in the vertical force applied to the cap onto the bottle to account for variations in threading. Thus, there exists a present need for a fully automated cap application device for applying childproof caps onto bottles.

BRIEF SUMMARY OF THE INVENTION

It is an objective of the present invention to provide devices that allow for a fully automated cap application device for applying childproof caps onto bottles, as specified in the independent claims. Embodiments of the invention are given in the dependent claims. Embodiments of the present invention can be freely combined with each other if they are not mutually exclusive.

The present invention features an autonomous cap attachment device for attaching a cap comprising a first set of threads to a bottle comprising a second set of threads configured to engage with the first set of threads. In some embodiments, the device may comprise a cap feed line configured to contain the cap and a bottle feed line configured to contain the bottle. The device may further comprise a pick & place assembly comprising an arm component and an arm movement assembly operatively coupled to the arm component, configured to move the arm component. The pick & place assembly may further comprise a cam-chuck component comprising a plurality of spring-loaded jaws configured to slide onto and grip the cap, and a plurality of slots disposed interstitially between the plurality of spring-loaded jaws.

The device may further comprise a compensation slide assembly operatively coupled to the arm movement assembly, comprising a spring component. The spring component may be configured to compress when the cap is lowered onto the bottle such that the first set of threads of the cap consistently engages with the second set of threads of the bottle and over-application of force from the cap to the bottle is prevented. The device may further comprise a screw drive assembly operatively coupled to the cam-chuck component, configured to rotate the cam-chuck component such that the cap is screwed onto the bottle. The device may further comprise an optical error detection assembly comprising a first optical sensor configured to detect whether or not the cap is gripped by the cam-chuck component and a second optical sensor configured to detect whether or not the cap is in the correct position in the cam-chuck component.

This assembly is a remotely operated system that caps a bottle with a child-resistant cap. The system will use a "cam-chuck" to pick up a cap from a known location, move it to another location above a bottle, and then lower it while rotating such that the threads engage between the bottle and cap. The cap is rotated until the cap bottoms out on the top of the bottle and the correct torque is applied according to the clutch setting.

One of the unique and inventive technical features of the present invention is the implementation of a compliance spring in the vertical pressure component for bringing the cap down onto the bottle. Without wishing to limit the invention to any theory or mechanism, it is believed that the technical feature of the present invention advantageously provides for the consistent childproof application of caps to bottles while accounting for discrepancies in threading on the cap and/or bottle. None of the presently known prior references or work has the unique inventive technical feature of the present invention.

Another one of the unique and inventive technical features of the present invention is the implementation of a plurality of infrared sensors disposed optically in-line with the cap gripping component, configured to optically detect the presence and configuration of a cap held in said component. Without wishing to limit the invention to any theory or mechanism, it is believed that the technical feature of the present invention advantageously provides for autonomous error detection and correction for cap configuration. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Figure 1A:
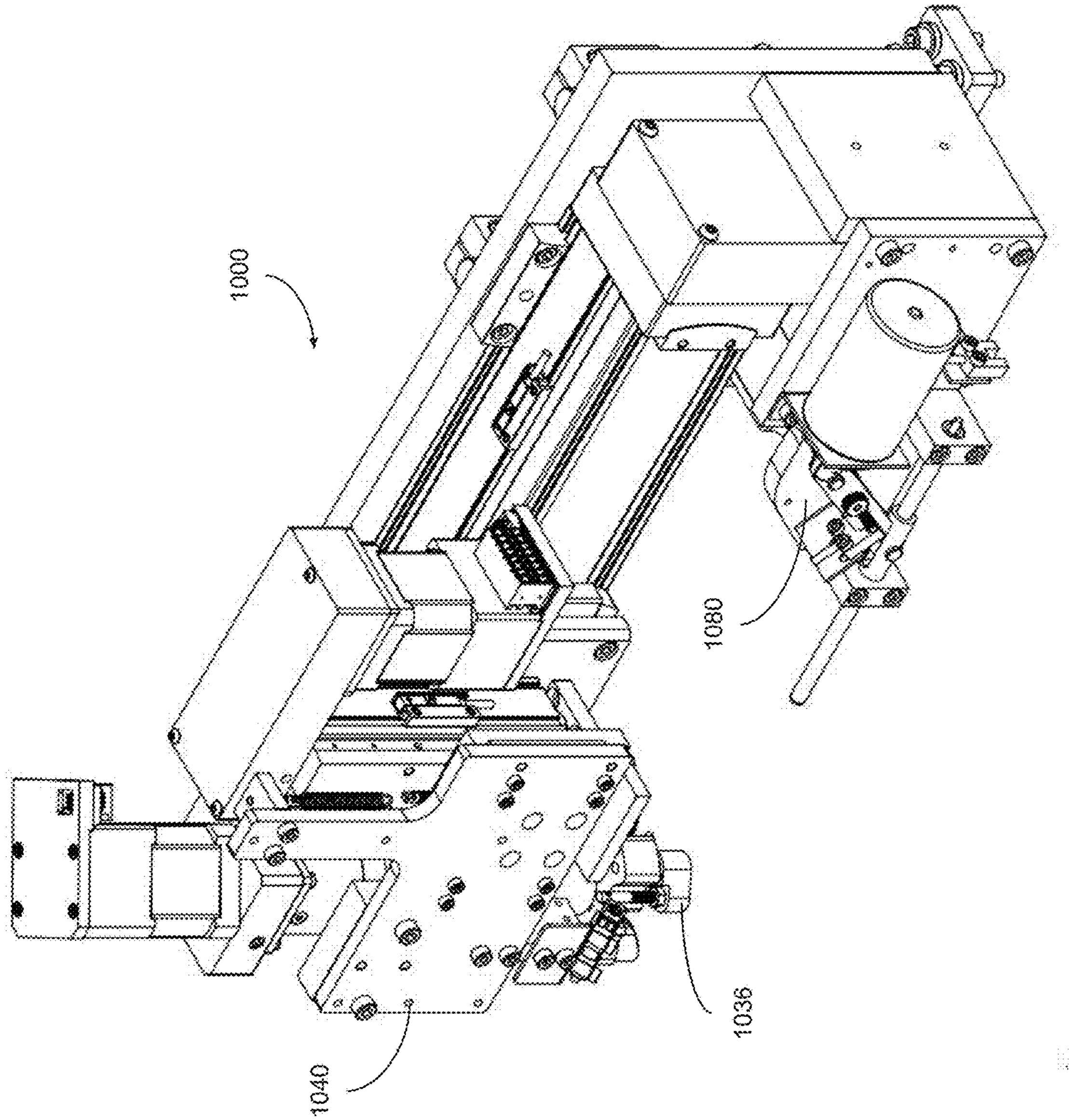
FIG. 1A shows an isometric view of the cap assembly system of the present invention.
Figure 1B:
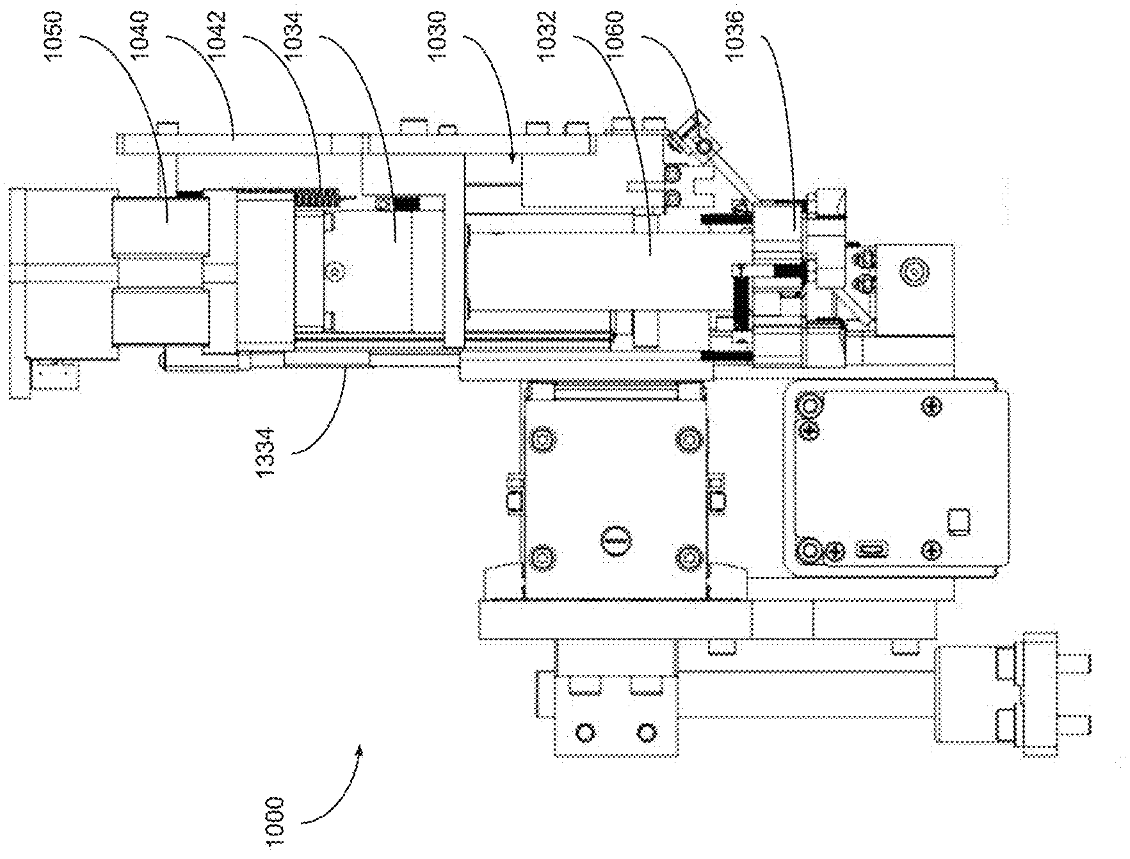
FIG. 1B shows a front view of the cap assembly system of the present invention.
Figure 1C:
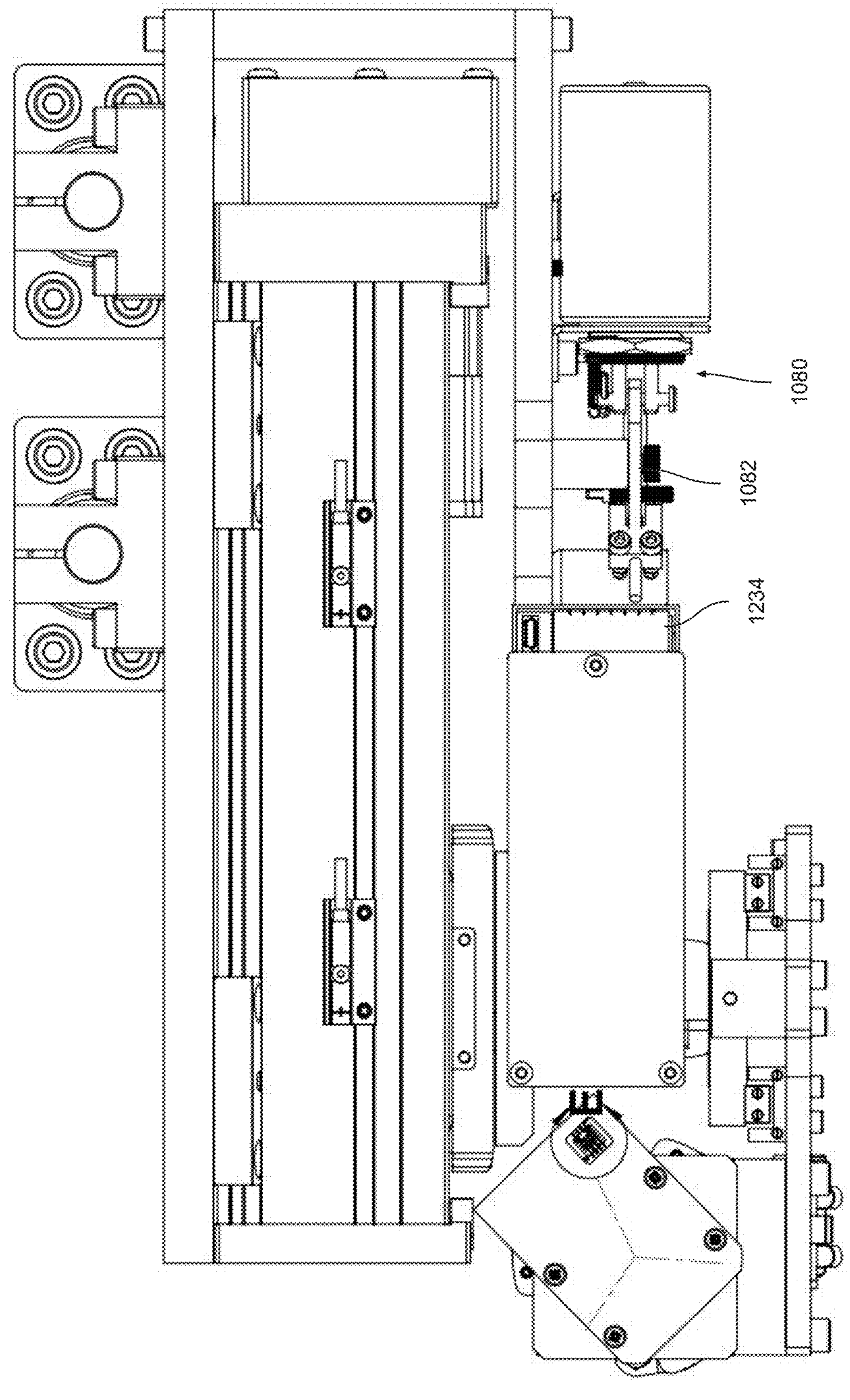
FIG. 1C shows a top view of the cap assembly system of the present invention.
Figure 1D:
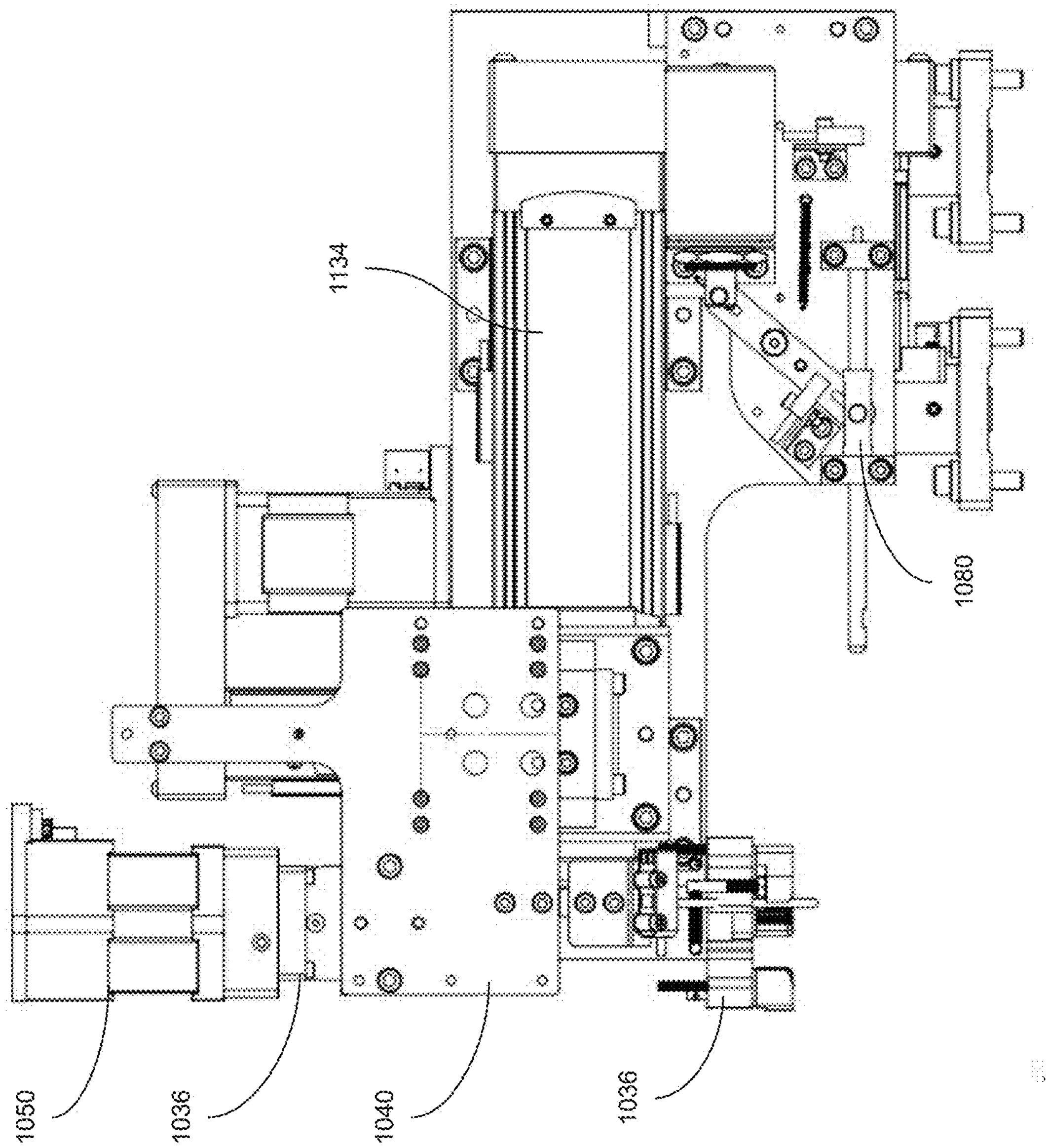
FIG. 1D shows a side view of the cap assembly system of the present invention.
Figure 2A:
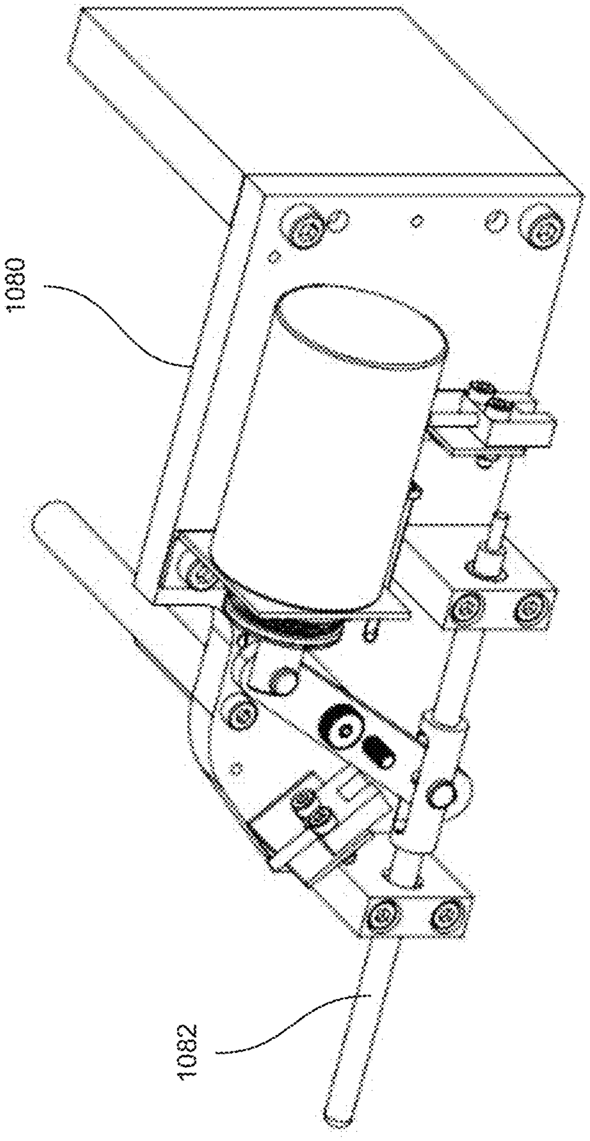
FIG. 2A shows an isometric view of the spring-pin assembly of the present invention.
Figure 2B:
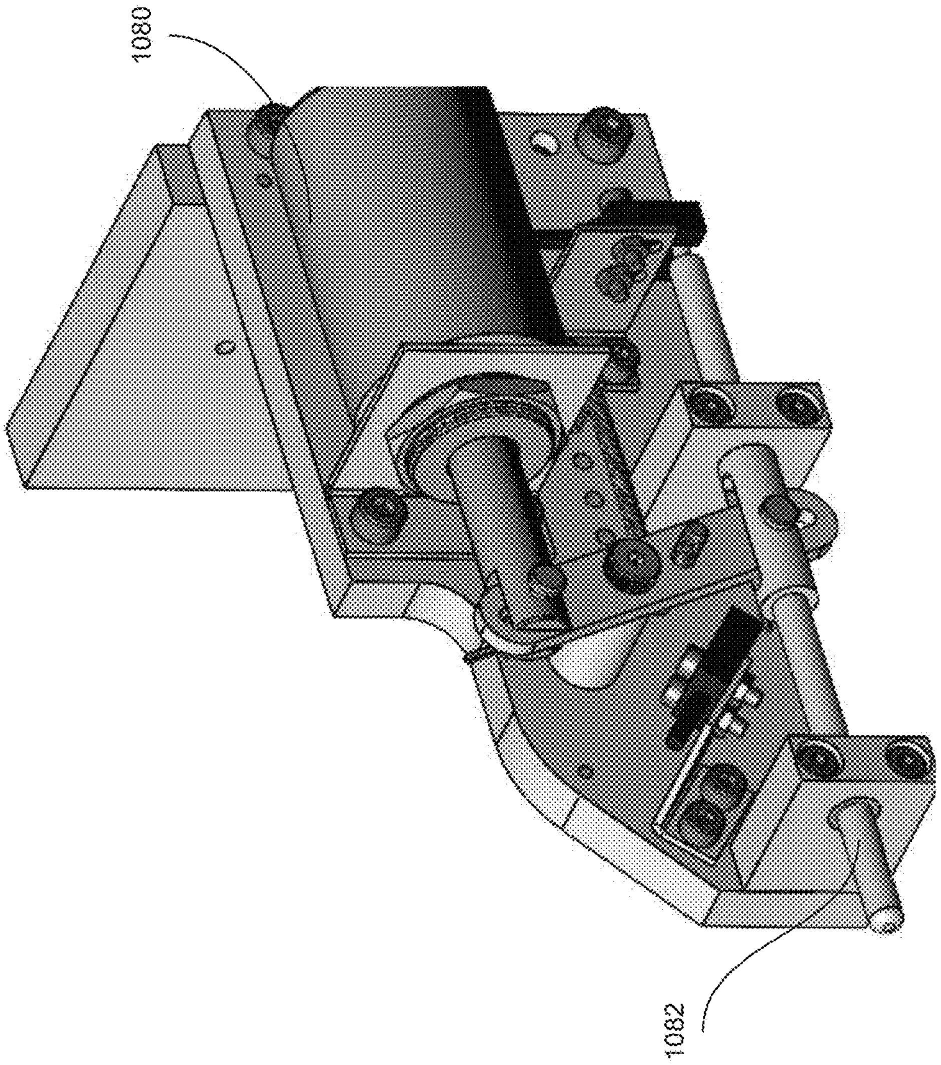
FIG. 2B shows an X-ray view of the spring-pin assembly of the present invention in a retracted configuration.
Figure 2C:
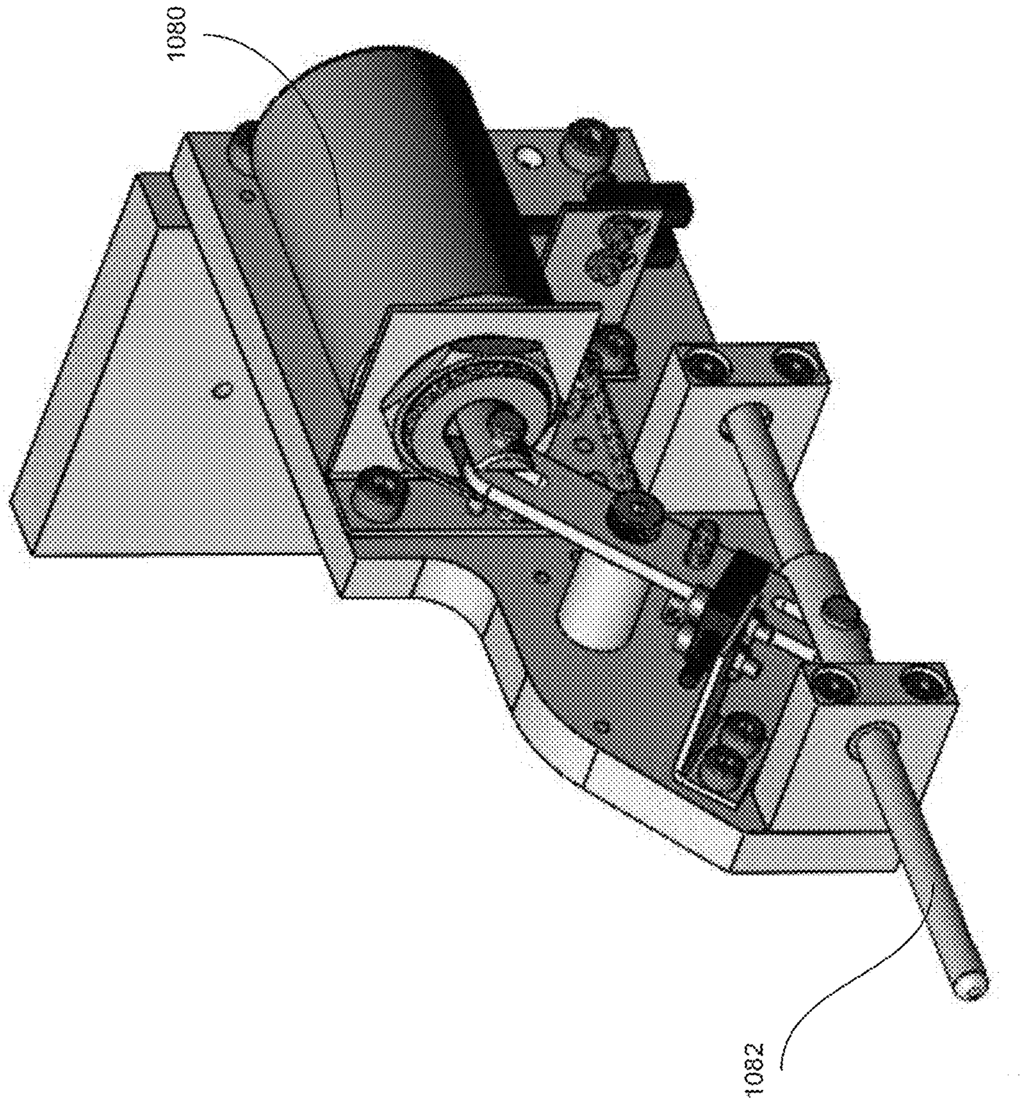
FIG. 2C shows an X-ray view of the spring-pin assembly of the present invention in an extended configuration.
Figure 3A:
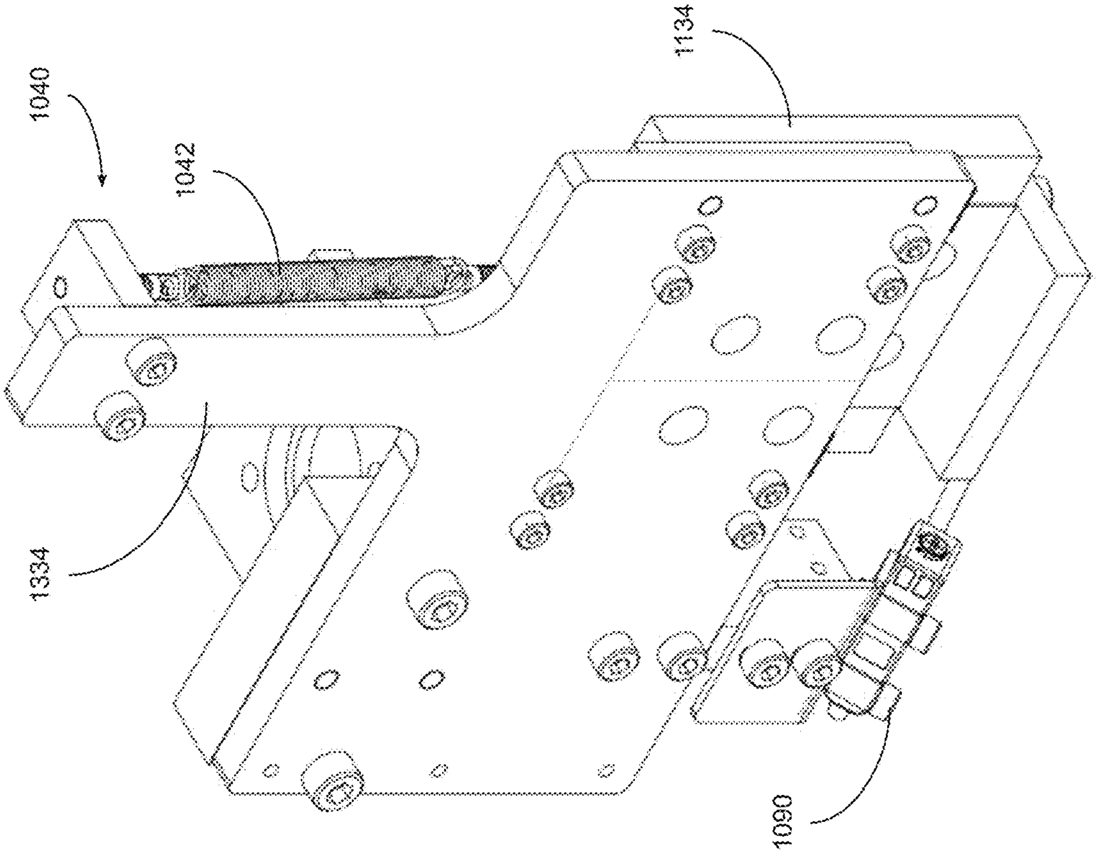
FIG. 3A shows an isometric view of the compensation slide assembly of the present invention.
Figure 3C:
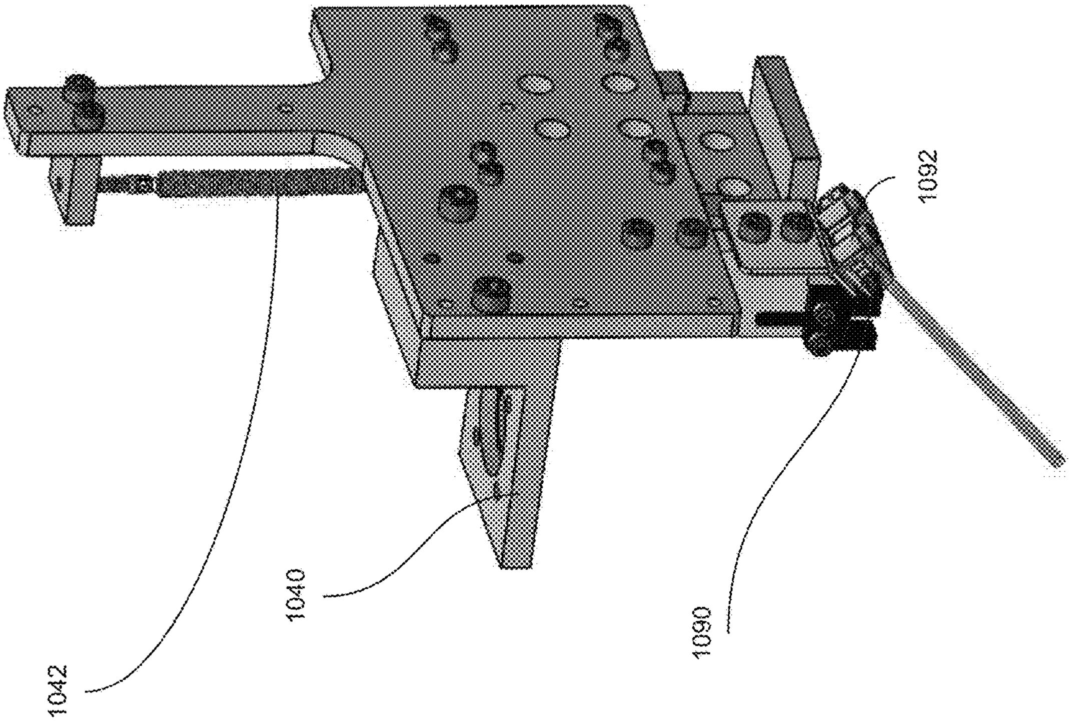
FIG. 3C shows another alternate view of the compensation slide assembly of the present invention.
Figure 3B:
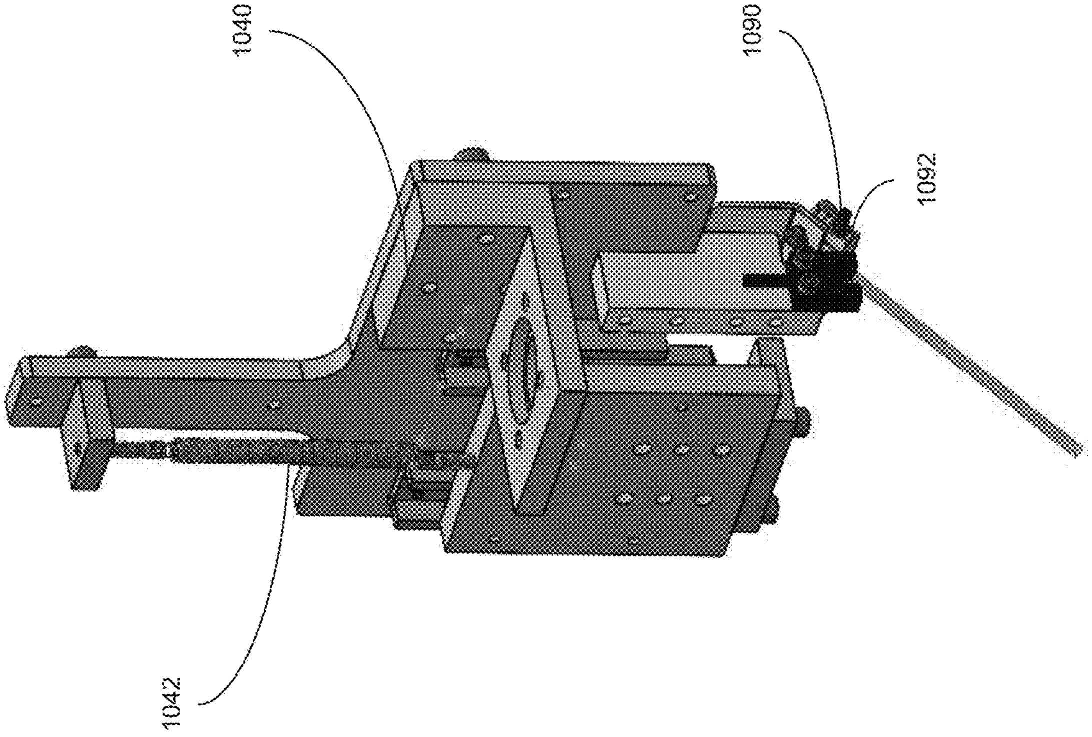
FIG. 3B shows an alternate view of the compensation slide assembly of the present invention.
Figure 4:
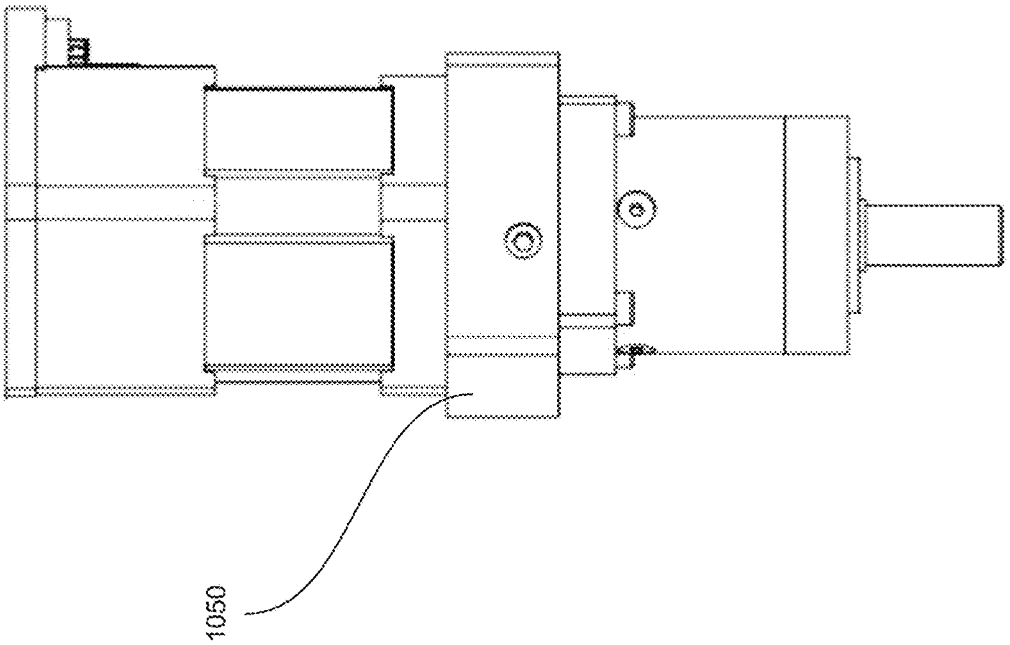
FIG. 4 shows the screw drive assembly of the present invention.
Figure 5B:
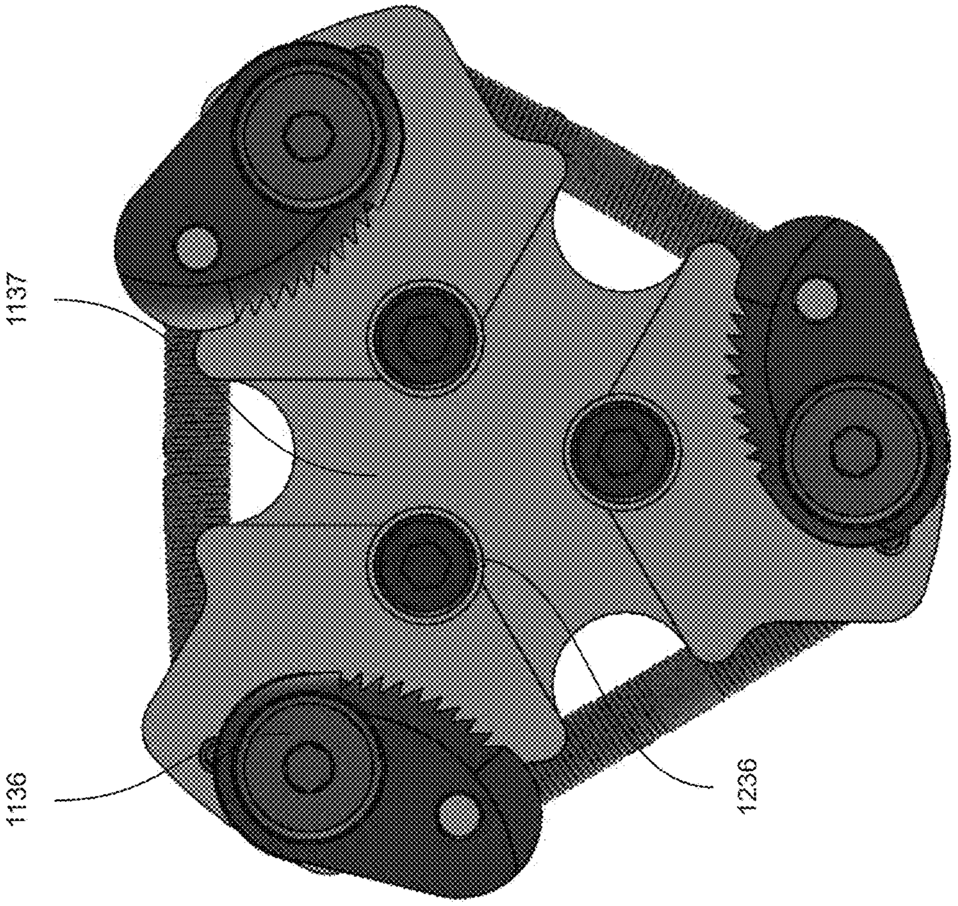
FIG. 5B shows a bottom view of the cam-chuck component of the present invention.
Figure 5A:
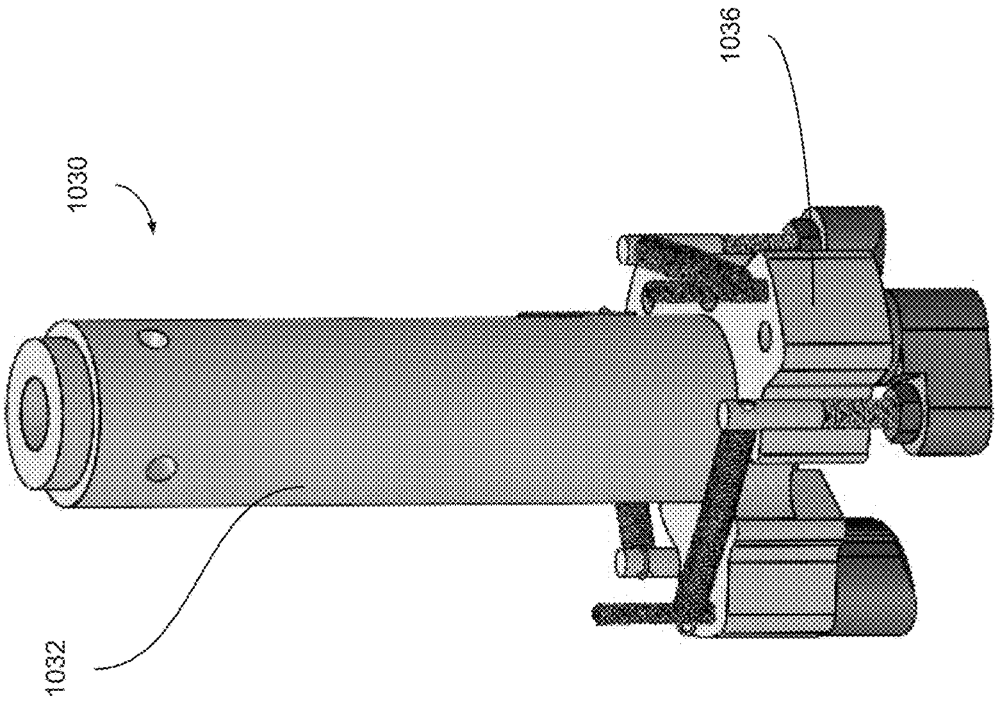
FIG. 5A shows an isometric view of the pick & place assembly of the present invention.
Figure 5D:
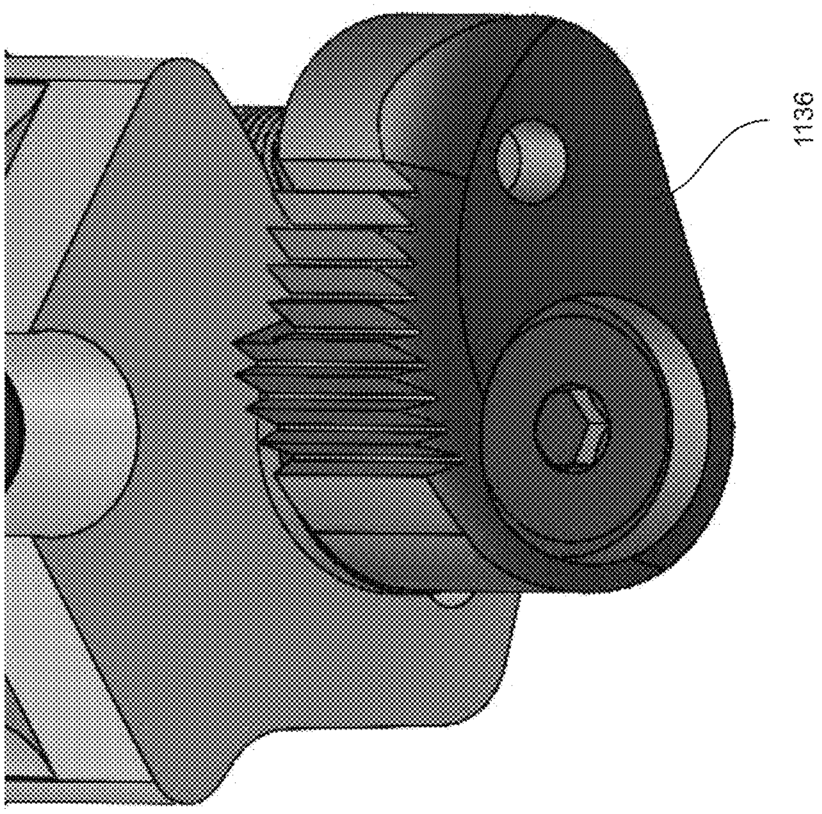
FIG. 5D shows a close-up of a spring-loaded jaw of the cam-chuck component of the present invention.
Figure 5C:
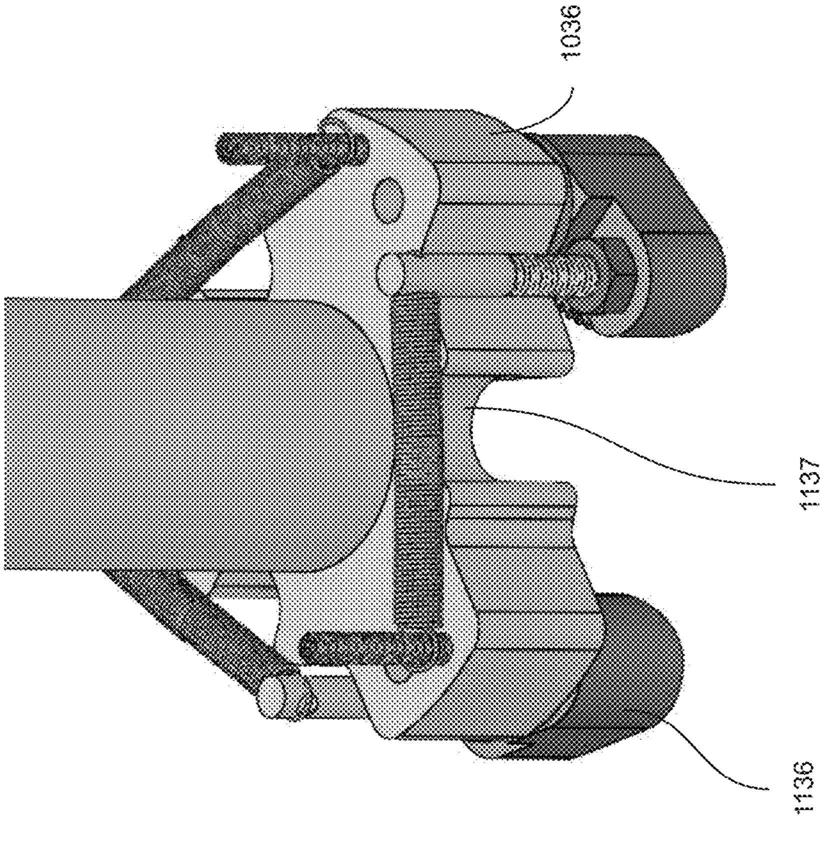
FIG. 5C shows an isometric view of the cam-chuck component of the present invention.
Figure 6:
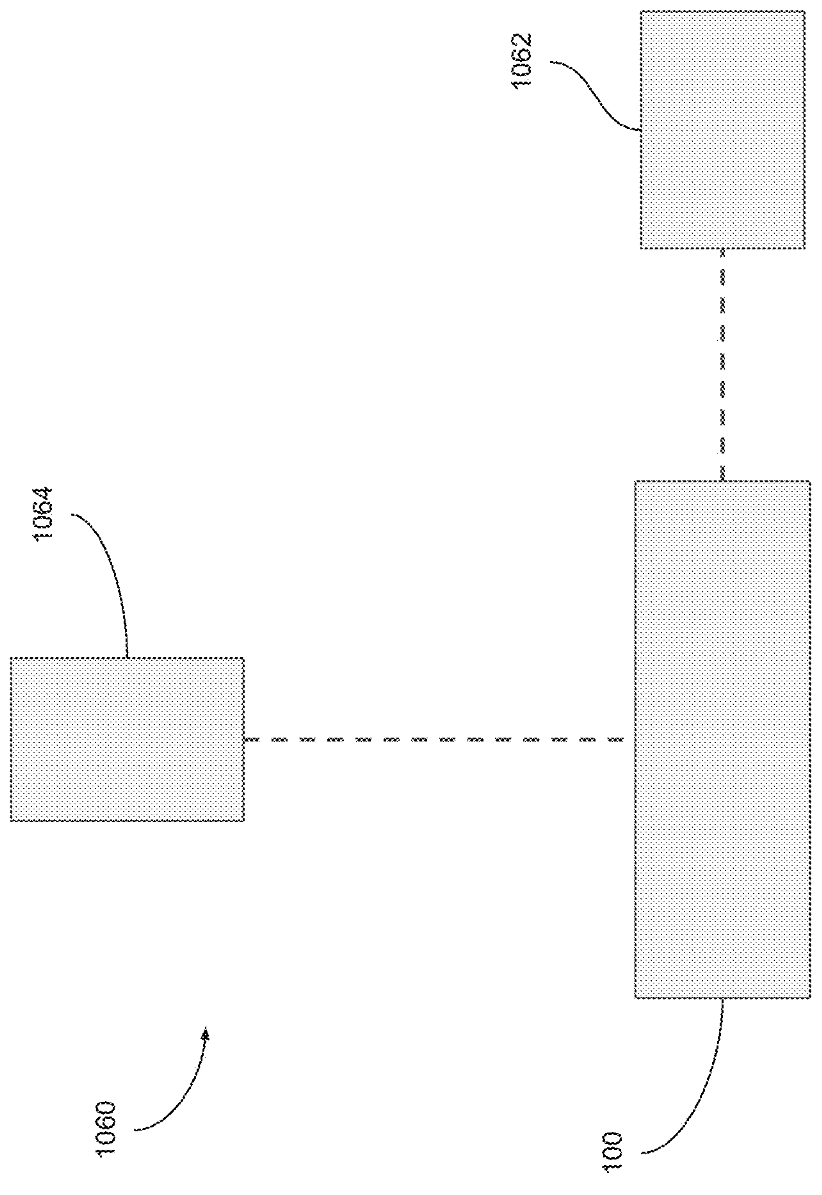
FIG. 6 shows a schematic of the optical error detection assembly of the present invention.
Figure 7:
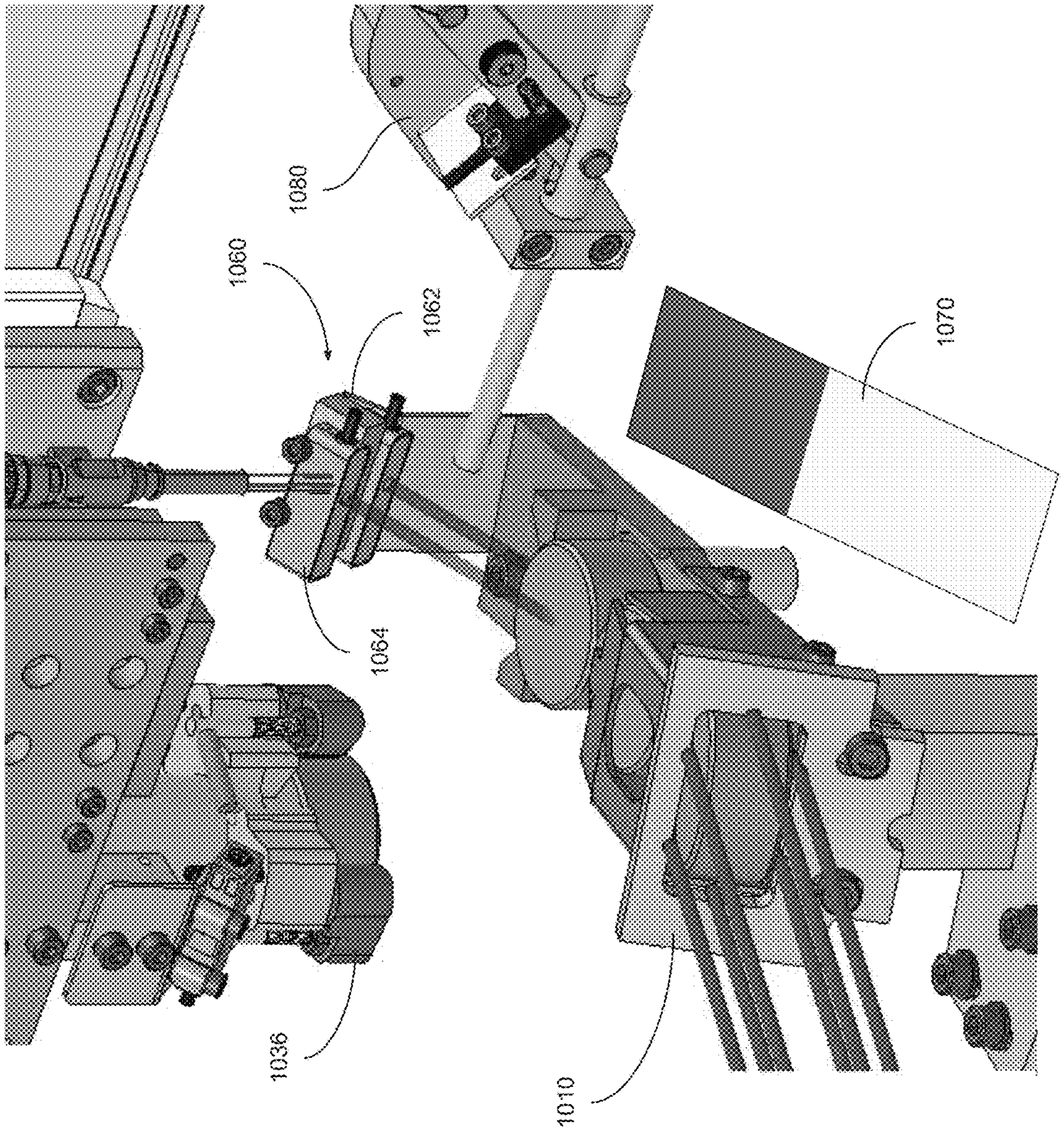
FIG. 7 shows a view of the cap feed line, the spring-pin assembly, the cap return chute, and the optical error detection component of the present invention.
Figure 8:
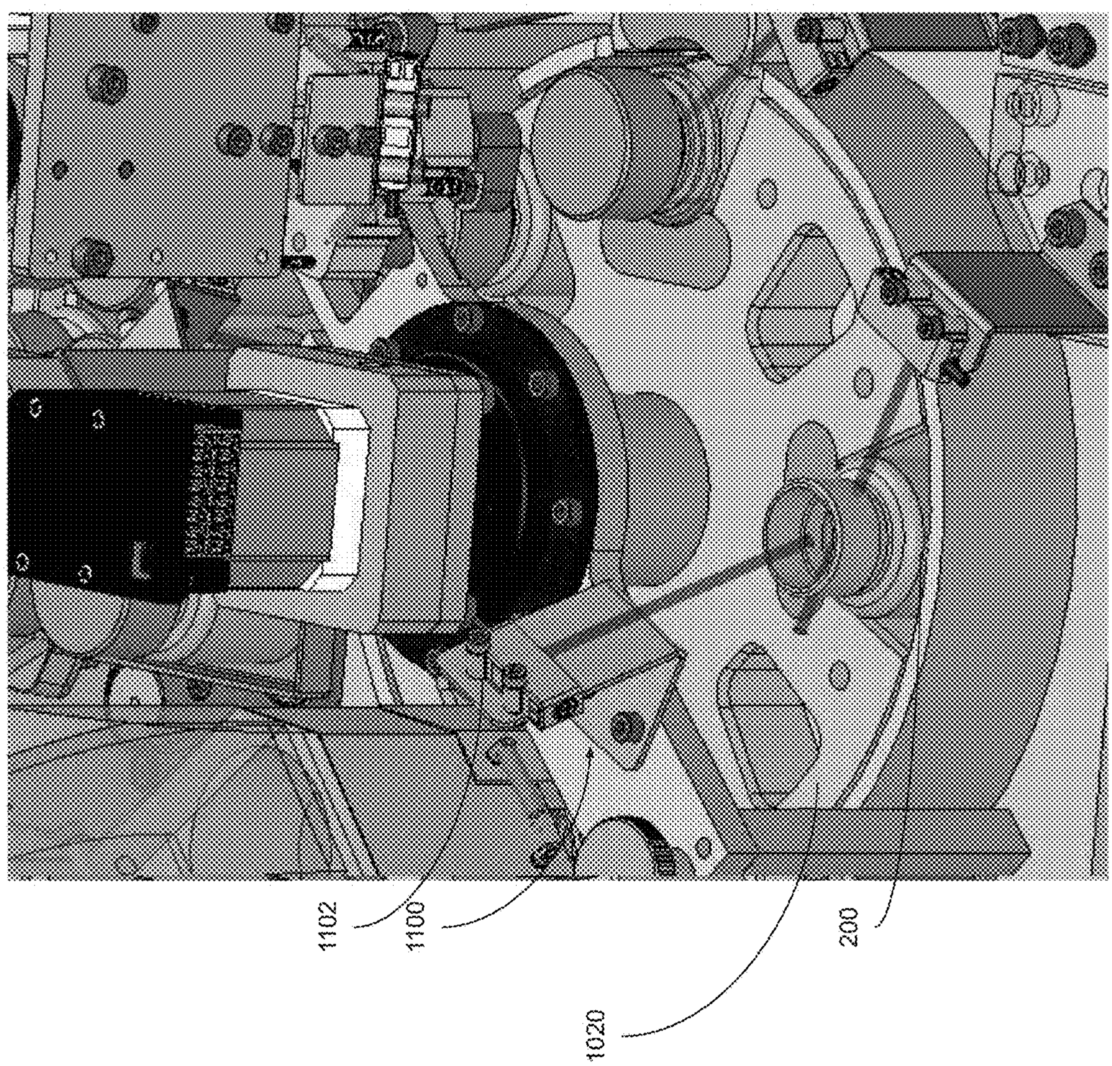
FIG. 8 shows a view of the bottle feed line and the optical sealed bottle detection assembly of the present invention.

Following is a list of elements corresponding to a particular element referred to herein:

100 cap
200 bottle
1000 device
1010 cap feed line
1020 bottle feed line
1030 pick & place assembly
1032 arm component
1034 arm movement assembly
1036 cam-chuck component
1040 compensation slide assembly
1050 screw drive assembly
1060 optical error detection assembly
1062 first optical sensor
1064 second optical sensor
1070 cap return chute
1080 spring-pin assembly
1082 spring-loaded pin component
1090 optical cap detection assembly
1092 third optical sensor
1100 optical sealed bottle detection assembly
1102 fourth optical sensor
1134 X-axis movement component
1136 spring-loaded jaws
1137 slots
1234 Y-axis movement component
1236 cam component
1334 Z-axis movement component Referring now to FIGS. 1A-1D, the present invention features an autonomous cap attachment device (1000) for attaching a cap (100) comprising a first set of threads to a bottle (200) comprising a second set of threads configured to engage with the first set of threads. In some embodiments, the device (1000) may comprise a cap feed line (1010) configured to contain the cap (100) and a bottle feed line (1020) configured to contain the bottle (200).

The device (1000) may further comprise a pick & place assembly (1030) comprising an arm component (1032) and an arm movement assembly (1034) operatively coupled to the arm component (1032), configured to move the arm component (1032). The arm movement assembly (1034) may comprise an X-axis movement component (1134) configured to move the arm component (1032) in a first lateral direction, a Y-axis movement component (1234) configured to move the arm component (1032) in a second lateral direction, and a Z-axis movement component (1334) configured to move the arm component (1032) vertically. In some embodiments, the X-axis movement component (1134), the Y-axis movement component (1234), the Z-axis movement component (1334), or a combination thereof may comprise one or more motors, one or more gearboxes, one or more movement paths defining a range of movement of the arm component (1032), or a combination thereof.

The pick & place assembly (1030) may further comprise a cam-chuck component (1036) disposed at an end of the arm component (1032), comprising a plurality of spring-loaded jaws (1136) configured to slide onto and grip the cap (100), and a plurality of slots (1137) disposed interstitially between the plurality of spring-loaded jaws (1136). In some embodiments, the plurality of spring-loaded jaws (1136) may comprise 3 to 6 jaws. In some embodiments, each slot of the plurality of slots (1137) may have a width of 1 to 7 mm. In some embodiments, the plurality of spring-loaded jaws (1136) may be evenly disposed around a circumference of a base component of the cam-chuck component (1036). In other embodiments, the gaps between the plurality of spring-loaded jaws (1136) may be uneven. In some embodiments, the base component of the cam-chuck component (1036) may comprise a circular cross-section, a square cross-section, or a cross-section having any equilateral, polygonal shape.

The arm movement assembly (1034) may be configured to move the arm component (1032) such that the plurality of spring-loaded jaws (1136) slide onto and grip the cap (100), move the cap (100) optically in-line with an optical error detection assembly (1060) to check for errors in picking up the cap (100) (e.g. the cap was not gripped, the cap is upside-down), move the cap (100) vertically in-line with the bottle (200), lower the cap (100) onto the bottle (200) such that a downward force is applied to the cap (100), lift from the bottle (200) after the cap (100) is screwed onto the bottle (200) such that the plurality of spring-loaded jaws (1136) slide off of the cap (100), move the cam-chuck component (1036) in-line with a spring-pin assembly (1080) after the optical error detection assembly (1060) detects that the cap (100) is not in a correct position (e.g. the cap is upside-down), after the arm component (1032) is lifted from the bottle (200), or a combination thereof, and move the cam-chuck component (1036) optically in-line with an optical cap detection assembly (1090) after the arm component (1032) is lifted from the bottle (200).

The device (1000) may further comprise a compensation slide assembly (1040) operatively coupled to the arm movement assembly (1034), comprising a spring component (1042). The spring component (1042) may be configured to compress when the cap (100) is lowered onto the bottle (200) such that the first set of threads of the cap (100) consistently engages with the second set of threads of the bottle (200) and over-application of force from the cap (100) to the bottle (200) is prevented. For example, if the arm movement assembly (1034) lowers the cap (100) onto the bottle (200) and the first set of threads engage with the second set of threads, the arm movement assembly (1034) can keep moving downwards and the spring component (1042) can compress so that the cap (100) and the bottle (200) are not damaged, allowing for some compliance in threading differences, cap height differences, and bottle height differences. This may allow the device of the present invention to be compatible with any cap and bottle pair as long as said cap and bottle are compatible with each other. In some embodiments, the compensation slide assembly (1040) may be operatively coupled to the Z-axis movement component (1334).

The device (1000) may further comprise a screw drive assembly (1050) operatively coupled to the cam-chuck component (1036), configured to rotate the cam-chuck component (1036) such that the cap (100) is screwed onto the bottle (200). In some embodiments, the screw drive assembly (1050) may be driven by one or more motors, one or more gearboxes, or a combination thereof. In some embodiments, the screw drive assembly (1050) may be disposed at an end of the arm component (1032) opposite the cam-chuck component (1036). In other embodiments, the screw drive assembly (1050) may be directly coupled to the cam-chuck component (1036).

The device (1000) may further comprise the optical error detection assembly (1060) comprising a first optical sensor (1062) configured to detect whether or not the cap (100) is gripped by the cam-chuck component (1036) and a second optical sensor (1064) configured to detect whether or not the cap (100) is in the correct position in the cam-chuck component (1036). In some embodiments, the first optical sensor (1062), the second optical sensor (1064), or a combination thereof may comprise an infrared sensor. In some embodiments, the first optical sensor (1062), the second optical sensor (1064), or a combination thereof may comprise a through-beam sensor, a retro-reflective sensor, a diffuse reflective sensor, or any other form of optical sensor. In some embodiments, each optical sensor may comprise a light source configured to generate a light in a certain direction and at a certain length and a detection component configured to detect whether the light is blocked by an object or not. The first optical sensor (1062) may be configured to direct a light towards where the cap (100) should be in the cam-chuck component (1036), and detect if the light is blocked, which would be indicative of the cap being present. The second optical sensor (1064) may be configured to direct a light from a light source towards a top of the cap (100) and detect if the light is blocked by the cap. If the light is blocked, the cap (100) is in the correct position, and if the light does not meet the cap (100), the cap (100) is not in the correct position.

The device (1000) may further comprise a cap return chute (1070) configured to accept the cap (100) and transport the cap (100) to the cap feed line (1010). The device (1000) may further comprise the spring-pin assembly (1080) disposed over the cap return chute (1070), comprising a spring-loaded pin component (1082) configured to extend into and retract from the plurality of slots (1137) of the cam-chuck component (1036). Extending the pin component (1082) into a slot of the plurality of slots (1137) may dislodge the cap (100) from the cam-chuck component (1036) such that the cap (100) falls into the cap return chute (1070). In some embodiments, the pin component (1082) may have a width of 1 to 7 mm. In some embodiments, the pin component (1082) may have a width suitable for fitting into the plurality of slots (1137).

The spring-pin assembly (1080) may be used to dislodge the cap (100) from the cam-chuck component (1036) after it has been detected to be in the wrong position (e.g. upside-down, sideways). The spring-pin assembly (1080) may be used to check that the cam-chuck component (1036) is empty before attempting to grab another cap from the cap feed line (1010). The screw drive assembly (1050) may be further configured to incrementally rotate the cam-chuck component (1036) such that the pin component (1082) is configured to extend into and retract from each slot of the plurality of slots (1137). The screw drive assembly (1050) may be configured to rotate the cam-chuck component (1036) such that the pin component (1082) lines up with a slot of the plurality of slots (1137). The spring-pin assembly (1080) may be coupled to the screw drive assembly (1050) such that the pin component (1082) only extends when a slot is in-line with the pin component (1082), and the screw drive assembly (1050) only incrementally turns the cam-chuck component (1036) when the pin component (1082) has retracted. The screw drive assembly (1050) may be configured to incrementally turn the cam-chuck component (1036) a number of times equivalent to the number of slots.

The device (1000) may further comprise the optical cap detection assembly (1090), comprising a third optical sensor (1092) configured to detect whether or not the cap (100) is gripped by the cam-chuck component (1036) when the cam-chuck component (1036) is optically in-line with the optical cap detection assembly (1090). In some embodiments, the optical sensor may comprise an infrared sensor, a through-beam sensor, a retro-reflective sensor, a diffuse reflective sensor, or any other form of optical sensor. In some embodiments, the optical sensor may comprise a light source configured to generate a light in a certain direction and at a certain length and a detection component configured to detect whether the light is blocked by an object or not. The optical sensor may be configured to direct a light towards the cam-chuck component (1036) where the cap (100) would be. If the light is blocked, then the cap (100) is still in the cam-chuck component (1036). If the light is not blocked, then the cap (100) has been screwed onto the bottle (200).

The device (1000) may further comprise an optical sealed bottle detection assembly (1100) disposed optically in-line with the bottle (200), comprising a fourth optical sensor (1102) configured to detect, after the arm component (1032) is lifted from the bottle (200), whether or not the cap (100) is screwed onto the bottle (200). In some embodiments, the optical sensor may comprise an infrared sensor, a through-beam sensor, a retro-reflective sensor, a diffuse reflective sensor, or any other form of optical sensor. In some embodiments, the optical sensor may comprise a light source configured to generate a light in a certain direction and at a certain length and a detection component configured to detect whether the light is blocked by an object or not. The optical sensor may be configured to direct a light towards the bottle where the cap (100) should be. If the light is blocked, then the cap (100) has been screwed onto the bottle (200). If the light is not blocked, then the cap (100) has not been screwed onto the bottle (200).

In some embodiments, the cap feed line (1010) may be further configured to contain a plurality of caps and isolate the cap (100) from the plurality of caps, wherein when the cap (100) is removed from the cap feed line (1010), the cap feed line (1010) is configured to isolate another cap. In some embodiments, the cap feed line (1010) may be configured to detect when the cap (100) has been lifted from the cap feed line (1010). In some embodiments, the cap feed line (1010) may be motorized such that when the cap (100) is detected to be lifted from the cap feed line (1010), the cap feed line (1010) moves another cap into the place where the original cap (100) was such that it can be lifted by the cam-chuck component (1036).

In some embodiments, the bottle feed line (1020) may be further configured to contain a plurality of bottles and isolate the bottle (200) from the plurality of bottles, wherein when the bottle (200) is removed from the bottle feed line (1020), the bottle feed line (1020) is configured to isolate another bottle. In some embodiments, the bottle feed line (1020) may be configured to detect when the cap (100) has been screwed onto the bottle (200) and eject the bottle (200) with the cap (100) such that the bottle (200) can be collected. In some embodiments, the bottle feed line (1020) may be motorized such that upon ejecting the bottle (200), the bottle feed line (1020) moves another bottle into the place where the original bottle (200) was such that it can have a new cap screwed onto it.

In some embodiments, the cam-chuck component (1036) may further comprise a cam component (1236) operatively coupled to the plurality of spring-loaded jaws (1136), configured to increase tension applied by the plurality of spring-loaded jaws (1136) to the cap (100) when the cam-chuck component (1036) is rotated by the screw drive assembly (1050). This may aid with screwing the cap (100) onto the bottle (200). In some embodiments, after the cap (100) has been screwed onto the bottle (200), the cam component (1236) may be configured to release the extra tension such that the plurality of spring-loaded jaws (1136) can slide off of the cap (100).

In some embodiments, the cap feed line (1010), the bottle feed line (1020), the pick & place assembly (1030), the screw drive assembly (1050), the optical error detection assembly (1060), the spring-pin assembly (1080), the optical cap detection assembly (1090), optical sealed bottle detection assembly (1100), or a combination thereof may be communicatively coupled to a computing device. The computing device may comprise a processor configured to execute computer-readable instructions, and a memory component comprising computer-readable instructions. The computer-readable instructions may comprise actuating, operating, adjusting the properties of, and detecting errors with the various components of the device (1000). The computing device may further comprise a display component configured to display a status of each component coupled to the computing device. The computing device may further comprise an input component configured to allow a user to control the properties of the components communicatively coupled to the computing device.

The device may comprise a spring-loaded cam-chuck that has three serrated jaws. This system is lowered and pressed over a cap that expands the jaws slightly against the spring tension to accept the cap diameter. This spring tension creates friction on the cap such that it stays in the jaw of the chuck when lifted to be repositioned over a bottle. During rotation, the serrated jaws drive the cap in the rotation of the thread without slipping. The jaws are designed with an off-set "cam" such that the serrated jaws apply more grip force on the cap as the threads bottom out to meet the required torque.

A pick & place assembly may be operatively coupled to the cam-chuck for moving the chuck to various positions for actuation. This assembly may be configured to generate X-axis movement, Y-axis movement, Z-axis movement, or a combination thereof. This assembly may comprise an arm operatively coupled to the chuck, and one or more motors and one or more gearboxes operatively coupled to the arm to allow for the X-axis movement, the Y-axis movement, the Z-axis movement, or the combination thereof.

The device may further comprise a screw drive motor assembly. This assembly may comprise a motor and gearbox that provides the rotational torque to the chuck. The screw drive motor assembly may comprise current control capabilities in the motor to produce the desired amount of clutch consistently. It is mounted above and axially in-line with the chuck. This motor is controlled by an external automation system.

The device may further comprise a compensation slide assembly. One side of this assembly is mounted directly to the Z-axis of the pick & place assembly. The other side is what both the screw drive motor assembly and the chuck assembly are mounted to. In the middle of these two sides is a slide system with a spring that allows movement. This slide and spring system allows the pick & place to lower the Z-axis with the screw drive motor assembly and the chuck assembly such that the cap contacts the bottle, but the spring and slide allow it to over-travel without damage while at the same time applying some downforce to engage the threads.

The device may further comprise a spring-activated pin for a cap release assembly. This assembly is used to release a cap from the serrated chuck. There is a pin that can be retracted when not required or extended when required. This assembly is utilized in the two scenarios: 1) When a cap is fed upside down to the pick location and needs to be released so the system can pick a correctly fed cap. 2) When the system has a cap already in the chuck, but the system must be restarted or initialized.

When a cap must be released, the pick & place will position the serrated chuck in front of the pin. The chuck is orientated such that one of the three slots located between the serrated cams is aligned with the pin. The pin is then extended into the serrated chuck such that the release pin will push the cap down and separate the cap from the friction of the serrated chuck cams allowing it to fall onto the cap return chute.

The present invention features a method for attaching a cap (100) comprising a first set of threads to a bottle (200) comprising a second set of threads configured to engage with the first set of threads. The method may comprise isolating, by a cap feed line (1010), the cap (100) from a plurality of caps, and isolating, by a bottle feed line (1020), the bottle (200) from a plurality of bottles. The method may further comprise actuating the arm movement assembly (1034) to move the arm component (1032) vertically in-line with the cap (100), and move, by the Z-axis movement component (1334), the cam-chuck component (1036) down such that the plurality of spring-loaded jaws slide onto and grip the cap (100).

The method may further comprise moving the arm component (1032) such that the cap (100) is optically in-line with the optical error detection assembly (1060), detecting, by the first optical sensor (1062), whether or not the cap (100) is gripped by the cam-chuck component (1036), and detecting, by the second optical sensor (1064), whether or not the cap (100) is in the correct position in the cam-chuck component (1036). If the cap (100) is not detected in the cam-chuck component (1036), the method may further comprise moving the arm component (1032) back to the cap feed line (1010) and repeating the process by picking up another cap from the cap feed line (1010). If the cap (100) is detected to be in an incorrect position, the method may further comprise moving the arm component (1032) in-line with the spring-pin assembly (1080). The method may further comprise extending the spring-loaded pin component (1082) into a slot of the cam-chuck component (1036), retracting the spring-loaded pin component (1082) from the slot, incrementally rotating the cam-chuck component (1036) such that the next slot lines up with the pin component (1082), and repeating this process until the pin component (1082) has extended into every slot of the cam-chuck component (1036). This may dislodge the cap (100) from the cam-chuck component (1036) such that the cap (100) falls into the cap return chute (1070).

The method may further comprise moving the arm component (1032) such that the cap (100) is vertically in-line with the bottle (200) and lowering the cap (100) onto the bottle (200) such that the first set of threads engages with the second set of threads and the spring component (1042) compresses to prevent over-application of force from the cap (100) to the bottle (200). The method may further comprise actuating the screw drive assembly (1050) to rotate the cam-chuck component (1036), tighten the force applied to the cap (100) by the cam component (1236), and screw the cap (100) onto the bottle (200). The method may further comprise moving the arm component (1032) up such that the plurality of spring-loaded jaws (1136) slide off of the cap (100), and moving the cam-chuck component (1036) optically in-line with the optical cap detection assembly (1090).

The method may further comprise detecting, by the third optical sensor (1092), whether or not the cap (100) is gripped by the cam-chuck component (1036) or not. If the cap (100) is still detected in the cam-chuck component (1036), the method may further comprise moving the arm component (1032) in-line with the spring-pin assembly (1080) and repeating the cap dislodging process. The method may further comprise detecting, by the fourth optical sensor (1102), whether or not the cap (100) is screwed onto the bottle (200). If the cap (100) is not detected on the bottle (200), the bottle (200) is kept in place for the device (1000) to attempt to screw another cap (100) onto the bottle. The method may further comprise dispensing the bottle (200) such that it can be collected by a user.

The present invention features a method for attaching a cap (100) to a bottle (200). The method may comprise providing the cap (100) and providing the bottle (200). The method may further comprise gripping the cap (100), checking for errors in gripping the cap (100), and moving the cap (100) vertically in-line with the bottle (200). The method may further comprise lowering the cap (100) onto the bottle (200) such that the threads of the cap (100) and the bottle (200) engage. The method may further comprise screwing the cap (100) onto the bottle (200), checking for errors in screwing the cap (100) onto the bottle (200), and dispensing the bottle (200) for collection. If errors are detected, the cap (100) is dislodged and the process is repeated with a new cap.

The computer system can include a desktop computer, a workstation computer, a laptop computer, a netbook computer, a tablet, a handheld computer (including a smartphone), a server, a supercomputer, a wearable computer (including a SmartWatch™), or the like and can include digital electronic circuitry, firmware, hardware, memory, a computer storage medium, a computer program, a processor (including a programmed processor), an imaging apparatus, wired/wireless communication components, or the like. The computing system may include a desktop computer with a screen, a tower, and components to connect the two. The tower can store digital images, numerical data, text data, or any other kind of data in binary form, hexadecimal form, octal form, or any other data format in the memory component. The data/images can also be stored in a server communicatively coupled to the computer system. The images can also be divided into a matrix of pixels, known as a bitmap that indicates a color for each pixel along the horizontal axis and the vertical axis. The pixels can include a digital value of one or more bits, defined by the bit depth. Each pixel may comprise three values, each value corresponding to a major color component (red, green, and blue). A size of each pixel in data can range from 8 bits to 24 bits. The network or a direct connection interconnects the imaging apparatus and the computer system.

The term "processor" encompasses all kinds of apparatus, devices, and machines for processing data, including by way of example a programmable microprocessor, a microcontroller comprising a microprocessor and a memory component, an embedded processor, a digital signal processor, a media processor, a computer, a system on a chip, or multiple ones, or combinations, of the foregoing. The apparatus can include special-purpose logic circuitry, e.g., an FPGA (field programmable gate array) or an ASIC (application-specific integrated circuit). Logic circuitry may comprise multiplexers, registers, arithmetic logic units (ALUs), computer memory, look-up tables, flip-flops (FF), wires, input blocks, output blocks, read-only memory, randomly accessible memory, electronically-erasable programmable read-only memory, flash memory, discrete gate or transistor logic, discrete hardware components, or any combination thereof. The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The processor may include one or more processors of any type, such as central processing units (CPUs), graphics processing units (GPUs), special-purpose signal or image processors, field-programmable gate arrays (FPGAs), tensor processing units (TPUs), and so forth.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, a data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, drives, or other storage devices). The operations described in this specification can be implemented as operations performed by a data processing apparatus on data stored on one or more computer-readable storage devices or received from other sources.

Program code embodied on a computer readable medium may be transmitted using any appropriate medium, including but not limited to wireless, wireline, optical fiber cable, R.F, Bluetooth, storage media, computer buses, etc., or any suitable combination of the foregoing. Computer program code for carrying out operations for aspects of the present disclosure may be written in any combination of one or more programming languages, including an object oriented programming language such as Java, Smalltalk, C #, Ruby, or the like, conventional procedural programming languages, such as Pascal, FORTRAN, BASIC, or similar programming languages, programming languages that have both object-oriented and procedural aspects, such as the "C" programming language, C++, Python, or the like, conventional functional programming languages such as Scheme, Common Lisp, Elixir, or the like, conventional scripting programming languages such as PHP, Perl, Javascript, or the like, or conventional logic programming languages such as PROLOG, ASAP, Datalog, or the like.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user.

Examples of input devices include a keyboard, cursor control devices (e.g., a mouse or a trackball), a microphone, a scanner, and so forth, wherein the user can provide input to the computer. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. Examples of output devices include a display device (e.g., a monitor or projector), speakers, a printer, a network card, and so forth. Display devices may include display devices that provide visual information, this information typically may be logically and/or physically organized as an array of pixels. In addition, a computer can interact with a user by sending documents to and receiving documents from a device that is used by the user; for example, by sending web pages to a web browser on a user's client device in response to requests received from the web browser.

An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. In some implementations, the interface may be a touch screen that can be used to display information and receive input from a user. In the same or alternative embodiments, applications on a computer may employ an interface that includes what are referred to as "command line interfaces" (often referred to as CLI's).

CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft® Windows Powershell that employs object-oriented type programming architectures such as the Microsoft®.NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation®, a SPARC processor made by Sun Microsystems®, an Athlon, Sempron, Phenom, or Opteron processor made by AMD Corporation®, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related field will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation®; the Mac OS X operating system from Apple Computer Corp.®; a Unix® or Linux®-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

Connecting components may be properly termed as computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

EMBODIMENTS

The following embodiments are intended to be illustrative only and not to be limiting in any way.

Embodiment 1: A compensation slide assembly (1040) operatively coupled to an arm component (1032) of a cap assembly device (1000), comprising a spring component (1042), wherein the spring component (1042) is configured to compress when a cap (100) held by the arm component (1032) is lowered onto a bottle (200) such that a first set of threads of the cap (100) consistently engages with a second set of threads of the bottle (200) and over-application of force from the cap (100) to the bottle (200) is prevented.

Embodiment 2: An autonomous cap attachment device (1000) for attaching a cap (100) comprising a first set of threads to a bottle (200) comprising a second set of threads configured to engage with the first set of threads, the device (1000) comprising: an arm component (1032) configured to grip the cap (100), move the cap (100) vertically in-line with the bottle (200), and lower the cap (100) onto the bottle (200); and a compensation slide assembly (1040) operatively coupled to the arm component (1032), comprising a spring component (1042), wherein the spring component (1042) is configured to compress when the cap (100) is lowered onto the bottle (200) such that the first set of threads of the cap (100) consistently engages with the second set of threads of the bottle (200) and over-application of force from the cap (100) to the bottle (200) is prevented.

Embodiment 3: An optical error detection assembly (1060), configured to autonomously detect errors in a cap assembly device (1000), the assembly (1060) comprising: a first optical sensor (1062) configured to detect whether or not a cap (100) is gripped by an arm component (1032) of the device (1000); and a second optical sensor (1064) configured to detect whether or not the cap (100) is in the correct position in the arm component (1032) of the device (1000).

Embodiment 4: An autonomous cap attachment device (1000) for attaching a cap (100) comprising a first set of threads to a bottle (200) comprising a second set of threads configured to engage with the first set of threads, the device (1000) comprising: an arm component (1032) configured to grip the cap (100); and an optical error detection assembly (1060), configured to autonomously detect errors in gripping the cap (100), the assembly (1060) comprising: a first optical sensor (1062) configured to detect whether or not the cap (100) is gripped by the arm component (1032); and a second optical sensor (1064) configured to detect whether or not the cap (100) is in the correct position in the arm component (1032).

Embodiment 5: An autonomous cap attachment device (1000) for attaching a cap (100) comprising a first set of threads to a bottle (200) comprising a second set of threads configured to engage with the first set of threads, the device (1000) comprising: an arm component (1032) configured to grip the cap (100), move the cap (100) vertically in-line with the bottle (200), and lower the cap (100) onto the bottle (200); a compensation slide assembly (1040) operatively coupled to the arm component (1032), comprising a spring component (1042), wherein the spring component (1042) is configured to compress when the cap (100) is lowered onto the bottle (200) such that the first set of threads of the cap (100) consistently engages with the second set of threads of the bottle (200) and over-application of force from the cap (100) to the bottle (200) is prevented; and an optical error detection assembly (1060), configured to autonomously detect errors in gripping the cap (100), the assembly (1060) comprising: a first optical sensor (1062) configured to detect whether or not the cap (100) is gripped by the arm component (1032); and a second optical sensor (1064) configured to detect whether or not the cap (100) is in the correct position in the arm component (1032).

Although there has been shown and described the preferred embodiment of the present invention, it will be readily apparent to those skilled in the art that modifications may be made thereto that do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An autonomous cap attachment device (1000) for attaching a cap (100) comprising a first set of threads to a bottle (200) comprising a second set of threads configured to engage with the first set of threads, the device (1000) comprising:

a. a cap feed line (1010) configured to contain the cap (100);

b. a bottle feed line (1020) configured to contain the bottle (200);

c. a pick & place assembly (1030) comprising:

i. an arm component (1032);

ii. an arm movement assembly (1034) operatively coupled to the arm component (1032), configured to move the arm component (1032); and iii. a cam-chuck component (1036) disposed at an end of the arm component (1032), comprising a plurality of spring-loaded jaws (1136);

wherein the arm movement assembly (1034) is configured to move the arm component (1032) such that the plurality of spring-loaded jaws (1136) slide onto and grip the cap (100), move the cap (100) vertically in-line with the bottle (200), lower the cap (100) onto the bottle (200) such that a downward force is applied to the cap (100), and lift the plurality of spring-loaded jaws (1136) away from the bottle (200) after the cap (100) is screwed onto the bottle (200) such that the plurality of spring-loaded jaws (1136) slide off of the cap (100);

d. a compensation slide assembly (1040) operatively coupled to the arm movement assembly (1034), comprising a spring component (1042), wherein the spring component (1042) is configured to compress when the cap (100) is lowered onto the bottle (200) such that the first set of threads of the cap (100) consistently engages with the second set of threads of the bottle (200) and over-application of force from the cap (100) to the bottle (200) is prevented;

e. a screw drive assembly (1050) operatively coupled to the cam-chuck component (1036), configured to rotate the cam-chuck component (1036) such that the cap (100) is screwed onto the bottle (200); and f. an optical error detection assembly (1060), wherein the arm movement assembly (1034) is further configured to move the arm component (1032) such that the cap (100) gripped by the cam-chuck component (1036) is optically in-line with the optical error detection assembly (1060) before lowering the cap (100) onto the bottle (200), wherein the optical error detection assembly (1060) comprises:

i. a first optical sensor (1062) configured to detect whether or not the cap (100) is gripped by the cam-chuck component (1036); and ii. a second optical sensor (1064) configured to detect whether or not the cap (100) is in a correct position in the cam-chuck component (1036).

2. The device (1000) of claim 1 further comprising a cap return chute (1070) configured to accept the cap (100) and transport the cap (100) to the cap feed line (1010).

3. The device (1000) of claim 2 further comprising a spring-pin assembly (1080) disposed over the cap return chute (1070), wherein the cam-chuck component (1036) further comprises a plurality of slots (1137) disposed interstitially between the plurality of spring-loaded jaws (1136), wherein the arm movement assembly (1034) is further configured to move the arm component (1032) such that the cam-chuck component (1036) is in-line with the spring-pin assembly (1080), wherein the spring-pin assembly (1080) comprises a spring-loaded pin component (1082) configured to extend into and retract from the plurality of slots (1137);

wherein extending the pin component (1082) into a slot of the plurality of slots (1137) dislodges the cap (100) from the cam-chuck component (1036) such that the cap (100) falls into the cap return chute (1070);

wherein the screw drive assembly (1050) is further configured to incrementally rotate the cam-chuck component (1036) such that the pin component (1082) is configured to extend into and retract from each slot of the plurality of slots (1137).

4. The device (1000) of claim 3, wherein the arm movement assembly (1034) is configured to move the arm component (1032) such that the cam-chuck component (1036) is in-line with the spring-pin assembly (**1080*t*) after the second optical sensor (1064) detects that the cap (100) is not in the correct position, and after the arm component (1032) lifts from the bottle (200**).

5. The device (1000) of claim 1 further comprising an optical cap detection assembly (1090), wherein the arm movement assembly (1034) is further configured to move the arm component (1032) such that the cam-chuck component (1036) is optically in-line with the optical cap detection assembly (1090) after the arm component (1032) is lifted from the bottle (200), wherein the optical cap detection assembly (1090) comprises an optical sensor (1092) configured to detect whether or not the cap (100) is gripped by the cam-chuck component (1036).

6. The device (1000) of claim 1 further comprising an optical sealed bottle detection assembly (1100) disposed optically in-line with the bottle (200), wherein the optical sealed bottle detection assembly (1100) comprises an optical sensor (1102) configured to detect after the arm component (1032) is lifted from the bottle (200), whether or not the cap (100) is screwed onto the bottle (200).

7. The device (1000) of claim 1, wherein the cap feed line (1010) is further configured to contain a plurality of caps and isolate the cap (100) from the plurality of caps, wherein when the cap (100) is removed from the cap feed line (1010), the cap feed line (1010) is configured to isolate another cap.

8. The device (1000) of claim 1, wherein the bottle feed line (1020) is further configured to contain a plurality of bottles and isolate the bottle (200) from the plurality of bottles, wherein when the bottle (200) is removed from the bottle feed line (1020), the bottle feed line (1020) is configured to isolate another bottle.

9. The device (1000) of claim 1, wherein the arm movement assembly (1034) comprises:
a. an X-axis movement component (1134) configured to move the arm component (1032) in a first lateral direction;
b. a Y-axis movement component (1234) configured to move the arm component (1032) in a second lateral direction; and
c. a Z-axis movement component (1334) configured to move the arm component (1032) vertically.

10. The device (1000) of claim 1, wherein the cam-chuck component (1036) further comprises a cam component (1236) operatively coupled to the plurality of spring-loaded jaws (1136), configured to increase tension applied by the plurality of spring-loaded jaws (1136) to the cap (100) when the cam-chuck component (1036) is rotated by the screw drive assembly (1050).

11. An autonomous cap attachment device (1000) for attaching a cap (100) comprising a first set of threads to a bottle (200) comprising a second set of threads compatible with the first set of threads, the device (1000) comprising:
a. a cap feed line (1010) configured to contain the cap (100);
b. a bottle feed line (1020) configured to contain the bottle (200);
c. a pick & place assembly (1030) comprising:
i. an arm component (1032);
ii. an arm movement assembly (1034) operatively coupled to the arm component (1032), configured to move the arm component (1032); and
iii. a cam-chuck component (1036) disposed at an end of the arm component (1032), comprising a plurality of spring-loaded jaws (1136) configured to slide onto and grip the cap (100), and a plurality of slots (1137) disposed interstitially between the plurality of spring-loaded jaws (1136);
wherein the arm movement assembly (1034) is configured to move the arm component (1032) such that the plurality of spring-loaded jaws (1136) slide onto and grip the cap (100), move the cap (100) optically in-line with an optical error detection assembly (1060), move the cap (100) vertically in-line with the bottle (200), lower the cap (100) onto the bottle (200) such that a downward force is applied to the cap (100), lift the plurality of spring-loaded jaws (1136) away from the bottle (200) after the cap (100) is screwed onto the bottle (200) such that the plurality of spring-loaded jaws (1136) slide off of the cap (100), and move the cam-chuck component (1036) in-line with a spring-pin assembly (1080) after the optical error detection assembly (1060) detects that the cap (100) is not in a correct position, and after the arm component (1032) is lifted from the bottle (200);
d. a compensation slide assembly (1040) operatively coupled to the arm movement assembly (1034), comprising a spring component (1042), wherein the spring component (1042) is configured to compress when the cap (100) is lowered onto the bottle (200) such that the first set of threads of the cap (100) consistently engages with the second set of threads of the bottle (200) and over-application of force from the cap (100) to the bottle (200) is prevented;
e. a screw drive assembly (1050) operatively coupled to the cam-chuck component (1036), configured to rotate the cam-chuck component (1036) such that the cap (100) is screwed onto the bottle (200);
f. the optical error detection assembly (1060) comprising:
i. a first optical sensor (1062) configured to detect whether or not the cap (100) is gripped by the cam-chuck component (1036); and
ii. a second optical sensor (1064) configured to detect whether or not the cap (100) is in the correct position in the cam-chuck component (1036);
g. a cap return chute (1070) configured to accept the cap (100) and transport the cap (100) to the cap feed line (1010); and
h. the spring-pin assembly (1080) disposed over the cap return chute (1070), comprising a spring-loaded pin component (1082) configured to extend into and retract from the plurality of slots (1137) of the cam-chuck component (1036);
wherein extending the pin component (1082) into a slot of the plurality of slots (1137) dislodges the cap (100) from the cam-chuck component (1036) such that the cap (100) falls into the cap return chute (1070);
wherein the screw drive assembly (1050) is further configured to incrementally rotate the cam-chuck component (1036) such that the pin component (1082) is configured to extend into and retract from each slot of the plurality of slots (1137).

12. The device (1000) of claim 11, wherein the first optical sensor (1062), the second optical sensor (1064), or a combination thereof comprise an infrared sensor.

13. The device (1000) of claim 11 further comprising an optical cap detection assembly (1090), wherein the arm movement assembly (1034) is further configured to move the arm component (1032) such that the cam-chuck component (1036) is optically inline with the optical cap detection assembly (1090) after the arm component (1032) is lifted from the bottle (200), wherein the optical cap detection assembly (1090) comprises an optical sensor (1092) configured to detect whether or not the cap (100) is gripped by the cam-chuck component (1036).

14. The device (1000) of claim 11 further comprising an optical sealed bottle detection assembly (1100) disposed optically in-line with the bottle (200), wherein the optical sealed bottle detection assembly (1100) comprises an optical sensor (1102) configured to detect after the arm component (1032) is lifted from the bottle (200), whether or not the cap (100) is screwed onto the bottle (200).

15. The device (1000) of claim 11, wherein the cap feed line (1010) is further configured to contain a plurality of caps and isolate the cap (100) from the plurality of caps, wherein when the cap (100) is removed from the cap feed line (1010), the cap feed line (1010) is configured to isolate another cap.

16. The device (1000) of claim 11, wherein the bottle feed line (1020) is further configured to contain a plurality of bottles and isolate the bottle (200) from the plurality of bottles, wherein when the bottle (200) is removed from the bottle feed line (1020), the bottle feed line (1020) is configured to isolate another bottle.

17. The device (1000) of claim 11, wherein the arm movement assembly (1034) comprises:
a. an X-axis movement component (1134) configured to move the arm component (1032) in a first lateral direction;
b. a Y-axis movement component (1234) configured to move the arm component (1032) in a second lateral direction; and
c. a Z-axis movement component (1334) configured to move the arm component (1032) vertically.

18. The device (1000) of claim 11, wherein the cam-chuck component (1036) further comprises a cam component (1236) operatively coupled to the plurality of spring-loaded jaws (1136), configured to increase tension applied by the plurality of spring-loaded jaws (1136) to the cap (100) when the cam-chuck component (1036) is rotated by the screw drive assembly (1050).

19. An autonomous cap attachment device (1000) for attaching a cap (100) comprising a first set of threads to a bottle (200) comprising a second set of threads compatible with the first set of threads, the device (1000) comprising:

a. a cap feed line (1010) configured to contain the cap (100);

b. a bottle feed line (1020) configured to contain the bottle (200);

c. a pick & place assembly (1030) comprising:

i. an arm component (1032);

ii. an arm movement assembly (1034) operatively coupled to the arm component (1032), configured to move the arm component (1032), comprising:

A. an X-axis movement component (1134) configured to move the arm component (1032) in a first lateral direction;

B. a Y-axis movement component (1234) configured to move the arm component (1032) in a second lateral direction; and C. a Z-axis movement component (1334) configured to move the arm component (1032) vertically; and iii. a cam-chuck component (1036) disposed at an end of the arm component (1032), comprising a plurality of spring-loaded jaws (1136) configured to slide onto and grip the cap (100), and a plurality of slots (1137) disposed interstitially between the plurality of spring-loaded jaws (1136);

wherein the arm movement assembly (1034) is configured to move the arm component (1032) such that the plurality of spring-loaded jaws (1136) slide onto and grip the cap (100), move the cap (100) optically in-line with an optical error detection assembly (1060), move the cap (100) vertically in-line with the bottle (200), lower the cap (100) onto the bottle (200) such that a downward force is applied to the cap (100), lift the plurality of spring-loaded jaws (1136) away from the bottle (200) after the cap (100) is screwed onto the bottle (200) such that the plurality of spring-loaded jaws (1136) slide off of the cap (100), move the cam-chuck component (1036) in-line with a spring-pin assembly (1080) after the optical error detection assembly (1060) detects that the cap (100) is not in a correct position, and after the arm component (1032) is lifted from the bottle (200), and move the cam-chuck component (1036) optically in-line with an optical cap detection assembly (1090) after the arm component (1032) is lifted from the bottle (200);

d. a compensation slide assembly (1040) operatively coupled to the arm movement assembly (1034), comprising a spring component (1042), wherein the spring component (1042) is configured to compress when the cap (100) is lowered onto the bottle (200) such that the first set of threads of the cap (100) consistently engages with the second set of threads of the bottle (200) and over-application of force from the cap (100) to the bottle (200) is prevented;

e. a screw drive assembly (1050) operatively coupled to the cam-chuck component (1036), configured to rotate the cam-chuck component (1036) such that the cap (100) is screwed onto the bottle (200);

f. the optical error detection assembly (1060) comprising:

i. a first optical sensor (1062) configured to detect whether or not the cap (100) is gripped by the cam-chuck component (1036); and ii. a second optical sensor (1064) configured to detect whether or not the cap (100) is in the correct position in the cam-chuck component (1036);

g. a cap return chute (1070) configured to accept the cap (100) and transport the cap (100) to the cap feed line (1010);

h. the spring-pin assembly (1080) disposed over the cap return chute (1070), comprising a spring-loaded pin component (1082) configured to extend into and retract from the plurality of slots (1137) of the cam-chuck component (1036);

wherein extending the pin component (1082) into a slot of the plurality of slots (1137) dislodges the cap (100) from the cam-chuck component (1036) such that the cap (100) falls into the cap return chute (1070);

wherein the screw drive assembly (1050) is further configured to incrementally rotate the cam-chuck component (1036) such that the pin component (1082) is configured to extend into and retract from each slot of the plurality of slots (1137);

i. the optical cap detection assembly (1090), comprising a third optical sensor (1092) configured to detect whether or not the cap (100) is gripped by the cam-chuck component (1036) when the cam-chuck component (1036) is optically in-line with the optical cap detection assembly (1090); and j. an optical sealed bottle detection assembly (1100) disposed optically in-line with the bottle (200), comprising a fourth optical sensor (1102) configured to detect, after the arm component (1032) is lifted from the bottle (200), whether or not the cap (100) is screwed onto the bottle (200).

* * * * *